R. WILLIAMS.
MUSTACHE-SPOONS.

No. 195,067. Patented Sept. 11, 1877.

WITNESSES:
J. H. Scarborough.
Alex F. Roberts

INVENTOR:
R. Williams.
BY Munn & Co
ATTORNEYS.

UNITED STATES PATENT OFFICE.

ROGER WILLIAMS, OF YONKERS, NEW YORK, ASSIGNOR TO HIMSELF AND ROBERT J. ANDERSON, OF NEW YORK CITY.

IMPROVEMENT IN MUSTACHE-SPOONS.

Specification forming part of Letters Patent No. 195,067, dated September 11, 1877; application filed July 30, 1877.

*To all whom it may concern:*

Figure 1:
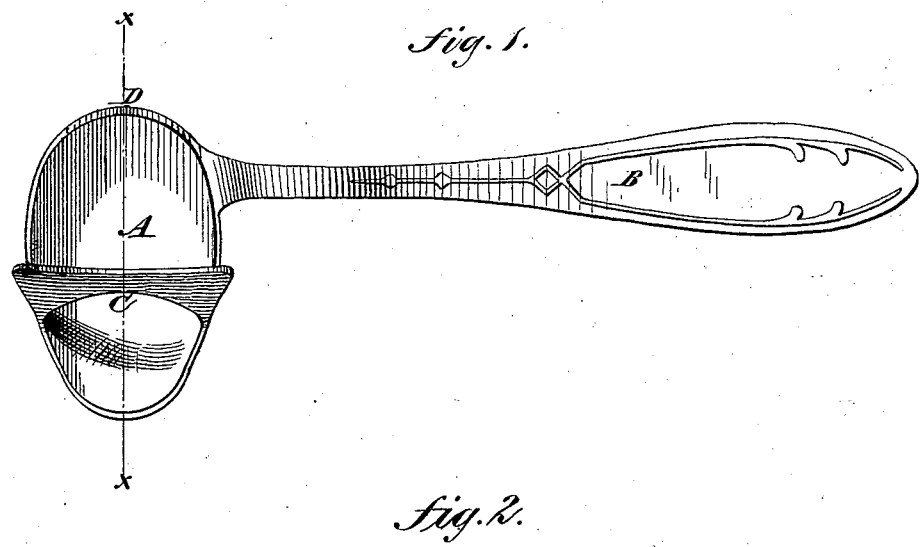
Figure 2:
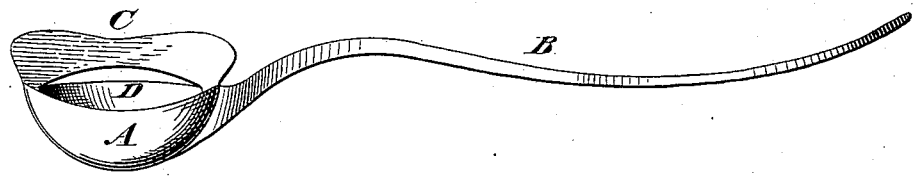
Figure 3:
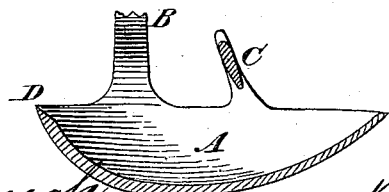

Be it known that I, ROGER WILLIAMS, of Yonkers, in the county of Westchester and State of New York, have invented a new and Improved Spoon, of which the following is a specification:

In the accompanying drawing, Figure 1 represents a top view, Fig. 2 a side view, of my improved spoon; and Fig. 3 is a vertical longitudinal section of the bowl of the same on line $x\ x$, Fig. 1.

Similar letters of reference indicate corresponding parts.

This invention relates to an improved spoon to be used by persons with mustaches, the spoon keeping off any part of the soup or other fluid from the mustache, while admitting the easy taking of the liquid, and also the convenient cutting of any larger part therein; and the invention consists of a spoon whose bowl is placed at a suitable angle to the handle, provided with a lateral mustache-guard, extending at slight inclination across the front part of the bowl, and arranged with a cutting-edge at the rear portion, as hereinafter more fully described and claimed.

In the drawing, A represents the bowl, and B the handle, of my improved spoon, of which the former is arranged at a suitable angle, preferably at an angle of ninety degrees to the handle. The bowl A is provided with a mustache-guard, C, that extends across the front part of the bowl, not in the shape of a funnel, as in the mustache-spoons heretofore in use, but in the nature of wings or blades, that rise at an angle with slight backward inclination from the bowl, so as to lift the mustache when the bowl is introduced into the mouth, and prevent thereby any soiling of the mustache by the grease of the soup, or by the medicine or other liquid taken with the spoon. The position of the bowl to the handle facilitates the taking up of the liquid over the rear part of the bowl and the ready conveying of the same into the mouth by a turn given to the handle, which tilts the bowl and empties the same of the liquid. The rear portion of the bowl is provided with a tapering edge, D, for the purpose of using the spoon, also for cutting larger articles in the soup, in the same manner as with the edges of the spoons in general use.

By constructing the bowl at right angles to the handle, and with a raised guard, the objections to the funnel-shaped styles of mustache-guards—namely, the difficulty of taking up the soup and the greasing of the guard—are overcome, and a convenient and practical spoon for eating soup, taking medicine, and for other purposes furnished, which may be used by persons with or without mustaches, as the liquid is readily taken on the spoon, quickly conducted into the mouth, the larger parts readily cut, and the mustache not soiled in the least.

Having thus described my invention, I claim as new and desire to secure by Letters Patent—

A spoon having a bowl at right angles to the handle, said bowl being provided with winged and inclined mustache-guard, extending across the front part, and with a cutting-edge at the rear part of the bowl, substantially for the purpose specified.

ROGER WILLIAMS.

Witnesses:
    PAUL GOEPEL,
    C. SEDGWICK.